UNITED STATES PATENT OFFICE.

JONAS INGMANSON, OF SYCAMORE, ILLINOIS.

IMPROVEMENT IN FERTILIZERS.

Specification forming part of Letters Patent No. 211,238, dated January 7, 1879; application filed May 28, 1877.

*To all whom it may concern:*

Be it known that I, JONAS INGMANSON, of Sycamore, in the county of De Kalb and State of Illinois, have invented certain Improvements in Fertilizers, of which the following is a specification:

My invention consists in a fertilizer composed of ingredients prepared and mixed in proportions as hereinafter described, and is applicable as a general fertilizing compound.

In carrying out my invention I take bones and grind them to a meal, and such ground bone I make the base of the compound, using ninety pounds of the ground bone. To this I add ten pounds of caustic lime, and mix the ground bone and lime well together. The dry mass thus formed is then moistened with a mixture of water and oil of vitriol, five pounds of the latter being added to five gallons of the former. The moist mass is then laid in a pile or heap, and the fertilizer is gradually produced by the chemical action attending the combination of the different ingredients.

When the combustion or decomposition resulting from the chemical heat evolved has ceased the fertilizer is ready for use or sale.

I am aware that mixtures of bone, lime, and acid have been used, wherein the proportions were substantially different from those herein set forth, and I therefore disclaim the mixture, broadly, of said ingredients, as also mixtures of bibasic phosphate with lime; but,

Having thus described my invention, what I claim as new, and wish to secure by Letters Patent of the United States, is—

A fertilizer composed of the following ingredients prepared and combined in substantially the manner and proportions herein specified—that is to say, ground bone, ninety pounds; caustic lime, ten pounds; mixed together with five pounds of oil of vitriol diluted by five gallons of water added thereto.

In testimony whereof I have hereunto subscribed my name this 20th day of December, in the year of our Lord 1876.

JONAS INGMANSON.

Witnesses:
 J. L. PRATT,
 F. T. JONES.